United States Patent
Brown et al.

(10) Patent No.: US 12,089,580 B2
(45) Date of Patent: Sep. 17, 2024

(54) SNAP SWIVEL

(71) Applicants: Patrick Brennen Brown, Miami, FL (US); Ryan Matthew Brown, Miami, FL (US); Jeffrey Liederman, Cooper City, FL (US)

(72) Inventors: Patrick Brennen Brown, Miami, FL (US); Ryan Matthew Brown, Miami, FL (US); Jeffrey Liederman, Cooper City, FL (US)

(73) Assignee: SEAQUALIZER VENTURES, LLC, Davie, FL (US)

( * ) Notice: Subject to any disclaimer, the term of this patent is extended or adjusted under 35 U.S.C. 154(b) by 140 days.

(21) Appl. No.: 17/978,825

(22) Filed: Nov. 1, 2022

(65) Prior Publication Data

US 2023/0138056 A1 May 4, 2023

Related U.S. Application Data

(60) Provisional application No. 63/360,798, filed on Nov. 1, 2021.

(51) Int. Cl.
*A01K 91/04* (2006.01)
*F16B 45/02* (2006.01)

(52) U.S. Cl.
CPC .................... *A01K 91/04* (2013.01)

(58) Field of Classification Search
CPC ......... Y10T 24/45408; Y10T 24/45424; Y10T 24/4523; Y10T 24/45414; Y10T 24/4545; F16B 45/012; F16B 45/02; F16B 45/023; F16B 45/027; F16B 45/034; F16B 45/035; F16B 45/036; A01K 91/04
See application file for complete search history.

(56) References Cited

U.S. PATENT DOCUMENTS

| 3,750,240 A * | 8/1973 | Fridrich | F16B 45/012 24/601.3 |
| 5,781,972 A * | 7/1998 | Steed | A01K 91/04 24/592.1 |
| 6,948,275 B1 * | 9/2005 | Lehmann | A01K 91/04 43/43.1 |

* cited by examiner

*Primary Examiner* — Jack W Lavinder
(74) *Attorney, Agent, or Firm* — Malloy & Malloy, P.L.; Robert M. Downey

(57) ABSTRACT

A snap swivel for fishing includes a snap component and a swivel component. The snap component includes an eye, a first arm member extending down from the eye, a second arm member defining a lever arm, a bottom flexure region extending between the first arm member and the second arm member, and the bottom flexure region exerting a biasing force to urge the second arm member to a relaxed open position. A coil arrangement formed about the first arm member includes an open gap for receipt of a latching hook on the end of the second arm member in interlocking engagement with the first arm member to close the snap with a distal tip of the latching hook contained within the coil arrangement and guarded to prevent snagging or cutting other fishing tackle.

5 Claims, 2 Drawing Sheets

SNAP SWIVEL

BACKGROUND OF THE INVENTION

This non-provisional patent application is based on provisional patent application Ser. No. 63/360,798 filed on Nov. 1, 2021.

FIELD OF THE INVENTION

The invention relates generally to fishing tackle fastening devices and, more particularly, to an improved snap swivel for use in attaching and interchanging lures, leaders, hooks, or other terminal tackle to a fishing line.

DESCRIPTION OF THE RELATED ART

Almost every fisherman will need to change hooks and baits, either live or artificial (e.g., lures), many times throughout the course of a day of fishing. Traditionally, fisherman have tied the main fishing line leading from the fishing reel directly to a hook, lure, leader or other terminal tackle. To do this, the main fishing line is threaded through an eye on a hook or lure, or through a loop on the end of a leader, and then tied in a knot. When it is desired to change the particular tackle, the main fishing line must be cut and then rethreaded and tied to another hook, leader, lure, etc. This can be tedious and time consuming, and may also result in loss of terminal fishing tackle due to poorly tied knots. To avoid the inconvenience of having to tie the fishing line to each lure, leader, hook, etc., many fishermen use a snap or a snap swivel that is tied to the main fishing line. A snap swivel is an item of terminal tackle, and enables fishermen to interchange lures, leaders, hooks, etc. without having to physically tie a knot with each interchange. A snap swivel is comprised of both a snap and a swivel. The snap allows for the quick connection of the main line to a lure, leader or other terminal tackle without the need to tie a knot, while the swivel provides 360 degrees of rotation to prevent the fishing line from becoming twisted. Most snaps on the market share the same flaw of the latching hook remaining exposed when the snap is in the closed position. This can cause the end of the latching hook to become snagged on other fishing tackle. In some instances, the end of the latching hook may actually cut the fishing line or leader, in which case the fisherman will lose the hook, lure, bait and/or other terminal tackle, as well as possibly a fish that may have been hooked. Another problem with the exposed latching hook on the traditional snap is the tendency of the loop of a leader to become lassoed onto the latching hook which may result in inadvertent opening of the snap when fishing. Obviously, this is highly undesirable.

SUMMARY OF THE INVENTION

Considering the problems and shortcomings associated with snap swivels and snaps in the related art, it is a primary object of the present invention to provide a snap for use alone or in conjunction with a swivel that will not become snagged and/or cut a fishing line or leader, and which will not be inadvertently opened when fishing.

According to the present invention, a snap portion of a snap swivel is formed from a single length of wire element that is formed, structured and configured to include an eye, a first arm member extending down from the eye, a second arm member defining a lever arm that is flexible toward and away from the first arm member, a bottom flexure region between the first arm and the second arm, and a coiled arrangement of rings wrapped about an upper portion of the first arm member just below the eye. A distal end portion of the second arm member is formed to provide a latching hook for releasable connection to the upper portion of the first arm member. When the snap is in the open position, the latching hook is separated from the first arm member, providing a gap between the latching hook and the first arm member and coiled arrangement of rings, to thereby allow for attachment of the snap to a lure, leader, hook or other terminal tackle. In the open position, the second arm member is in a relaxed state.

The coiled arrangement of rings on the upper portion of the first arm member includes a plurality of rings that are bunched together, as well as a lowermost ring that is spaced from the next adjacent ring to provide an open pitch or gap in the coiled arrangement. To close the snap, the second arm member is moved toward the first arm member against a biasing force created by the bottom flexure region, until the latching hook is received within the open pitch of the coiled arrangement and latched onto the first arm member within the coiled arrangement of rings. In the closed position, the latching hook is received within the open pitch of the coiled arrangement, with a distal end of the latching hook positioned within the coiled arrangement so that a distal tip of the latching hook is concealed and guarded to prevent snagging or cutting a fishing line, leader or other fishing tackle.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 3:
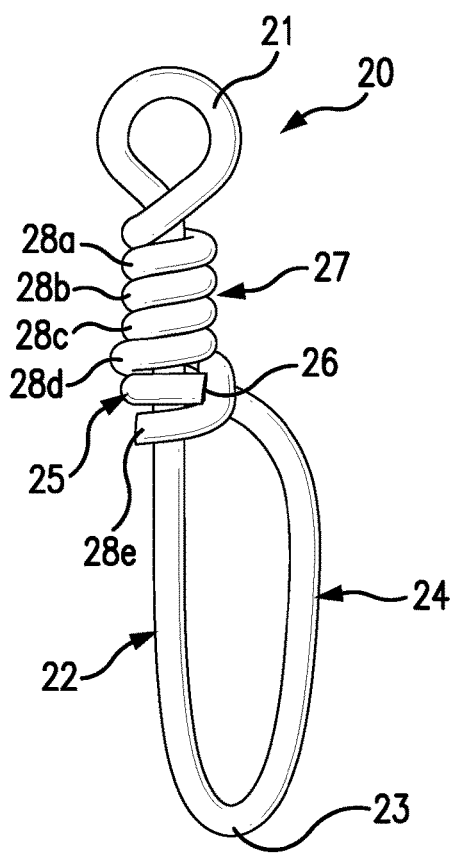
FIG. 3 is a front elevational view of the snap component in the closed position.
Figure 4:
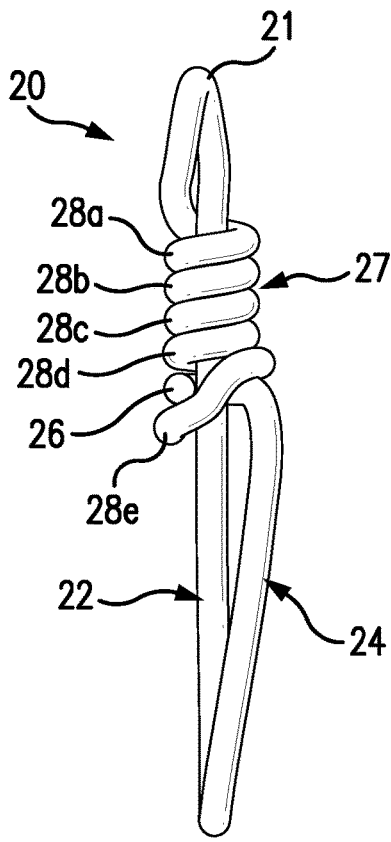
FIG. 4 is a right side elevational view of the snap component in the closed position.
Figure 5:
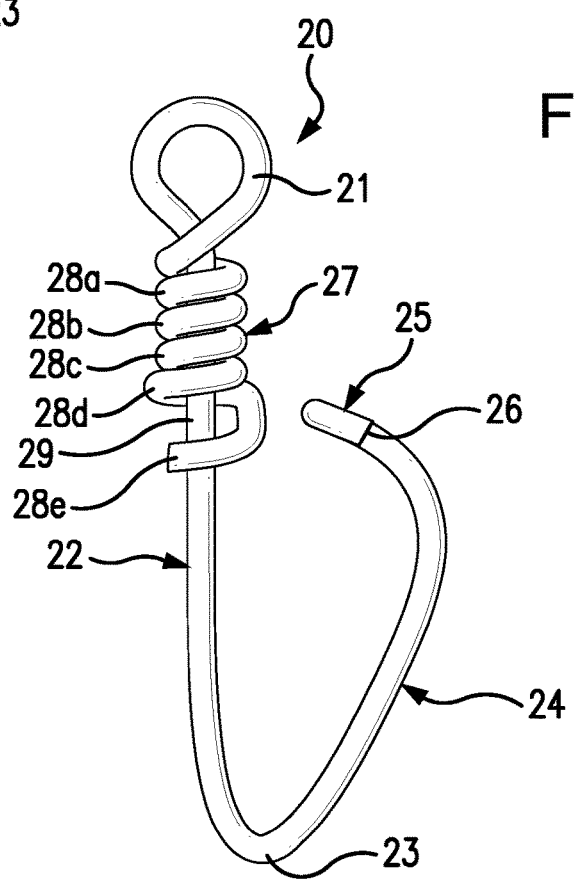
FIG. 5 is a front elevational view of the snap component shown in an open position.

Referring to the several views of the drawings, the snap swivel of the present invention is shown and is generally indicated as 10. The snap swivel is intended for use as terminal tackle for fishing to allow for quick interchanging of lures, leaders, hooks, etc. without having to physically tie a knot with each interchange. The snap swivel 10 includes two primary components, namely a snap 20 and a swivel 30. The snap component 20 is formed by a single wire element. In one preferred embodiment, the wire element is 304 spring stainless steel. The wire element is formed to create the snap component of the present invention. Referring to FIGS. 3-5, the snap component 20 includes an eye 21, a first arm member 22 extending down from the eye, a second arm member 24 defining a lever arm that is flexible toward and away from the first arm 22 at a bottom flexure region 23 between the first arm member and the second arm member. The flexure region exerts a biasing force on the second arm member 24 that urges the second arm member 24 to the open position seen in FIG. 5 which is a relaxed state. The snap 20 further includes a coil 27 formed about an upper portion of the first arm member 22, just below the eye 21. The coil 27 is formed to include adjacent spiraling rings 28a-28e about the first arm member 22 including four adjacent spiraling rings 28a-28d and a lowermost fifth ring 28e that is spaced from the fourth ring 29d to create an open pitch 29 (i.e., gap) in the coil arrangement 27. The coil 27 has an outer periphery defined by an outer circumference of the spiraling rings 28a-28e. A distal end of the second arm member 24 is formed into a latching hook 25 that is sized and configured for receipt within the open pitch 29 of the coiled arrangement 27 when the snap 20 is in a closed position, as seen in FIGS. 3 and 4. In the closed position, with the latching hook 25 received within the open pitch 29 of the coil arrangement 27, the latching hook is engaged with and held against the first arm member 22 by the biasing force exerted on the second arm member 24 and a distal tip 26 of the latching hook 25 is positioned within the coil arrangement 27 so that the distal tip 26 of the latching hook 25 is contained and concealed within the outer periphery of the coil and guarded to prevent snagging or cutting other fishing tackle.

Figure 1:
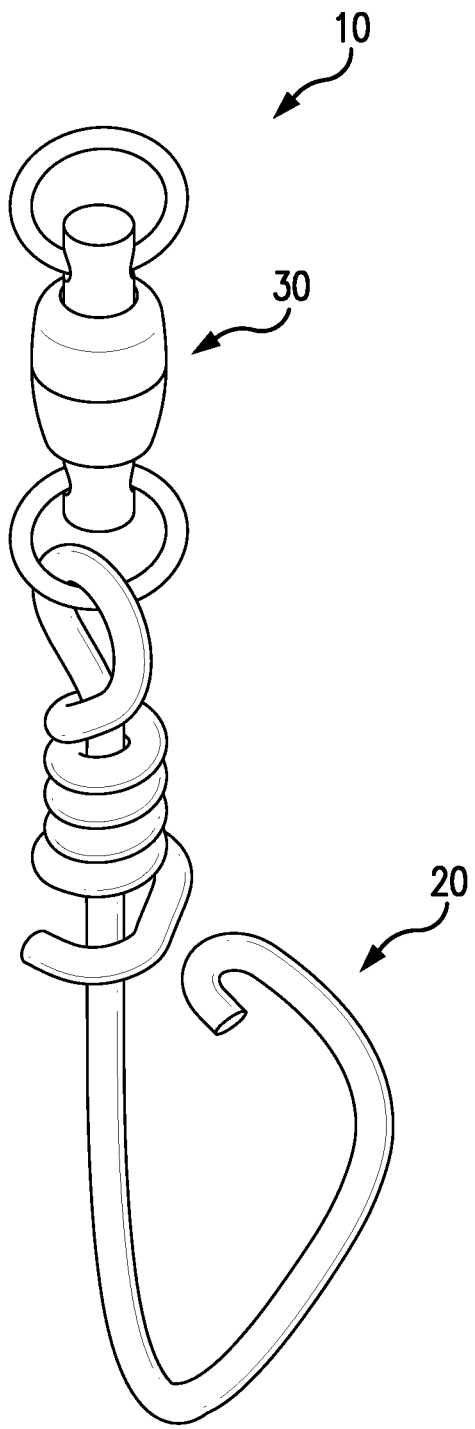
FIG. 1 is a front perspective view showing the snap swivel of the present invention with the snap component in an open position.
Figure 2:
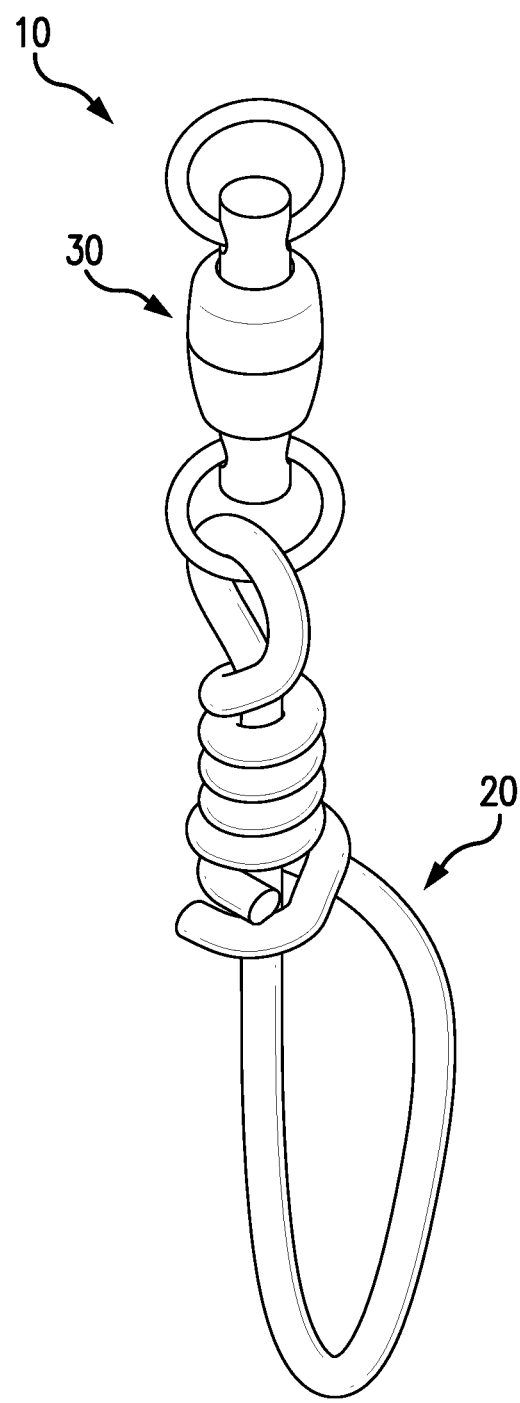
FIG. 2 is a front perspective view showing the snap swivel of the present invention with the snap component in a closed position.

The swivel component 30 is of the conventional and well-known type, often referred to as a barrel swivel. This swivel component 30, as seen in FIGS. 1 and 2, includes a central barrel portion that contains the swivel mechanism, and eyes extending from opposite ends of the barrel and interconnected to the interior swivel mechanism which thereby allows each of the eyes to independently rotate relative to the central barrel and each other. Thus, each eye is able to rotate entirely independent of the other eye as well as the central barrel. As seen in FIGS. 1 and 2, one of the eyes of the swivel component is interlinked or connected to the eye 21 on the top of the snap component 20.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A snap for fishing tackle comprising:
   an eye;
   a first arm member extending down from the eye;
   a second arm member defining a lever arm and being flexible toward and away from the first arm member, and the second arm member terminating at a latching hook at a top distal end portion of the second arm member, and the latching hook including a distal tip;
   a bottom flexure region extending between the first arm member and the second arm member and integral therewith, and the bottom flexure region exerting a biasing force to urge the second arm member to a relaxed position with the latching hook and distal tip separated and spaced away from the first arm member; and
   a coil arrangement including a plurality of adjacent spiraling rings formed about the first arm member and the coil arrangement having an outer periphery defined by an outer circumference of the plurality of adjacent spiraling rings, and the coil arrangement including an open gap between an adjacent two of the plurality of spiraling rings and exposing the first arm member within the open gap, and the open gap being sized and configured for receipt of the latching hook of the second arm member therein against the biasing force of the bottom flexure region and in interlocking connection with the first arm member so that the latching hook, including the distal tip, is contained within the outer periphery of the coil arrangement to thereby conceal the distal tip in a manner that discourages snagging or cutting of other fishing tackle by the latching hook.

2. The snap as recited in claim 1 wherein the open gap is between a lowermost one of the plurality of adjacent spiraling rings and a next one of the plurality of adjacent spiraling rings above the lowermost one of the plurality of adjacent spiraling rings.

3. The snap as recited in claim 1 wherein the snap is formed from a single length of wire.

4. The snap as recited in claim 3 wherein the single length of wire is formed of 304 spring stainless steel.

5. The snap as recited in claim 1 further comprising:
   a swivel including a central barrel portion and first and second eyes extending from opposite ends of the barrel, and each eye being rotatable independent of the other eye and the central barrel, and the first eye being interlinked to the eye on the first arm member of the snap.

* * * * *